Patented Aug. 16, 1932

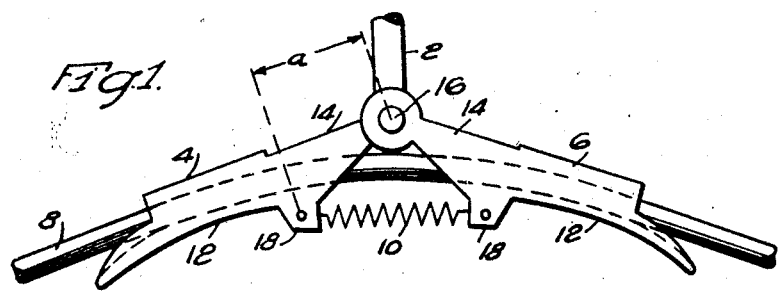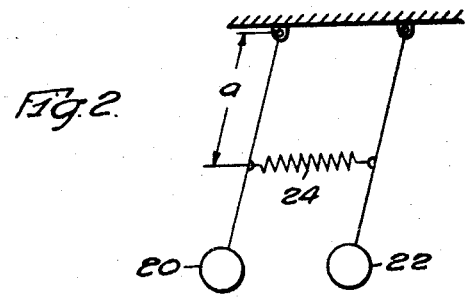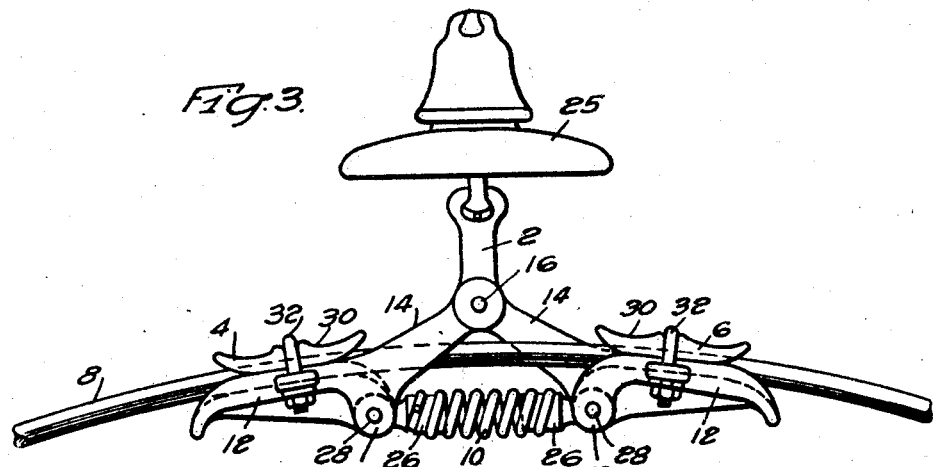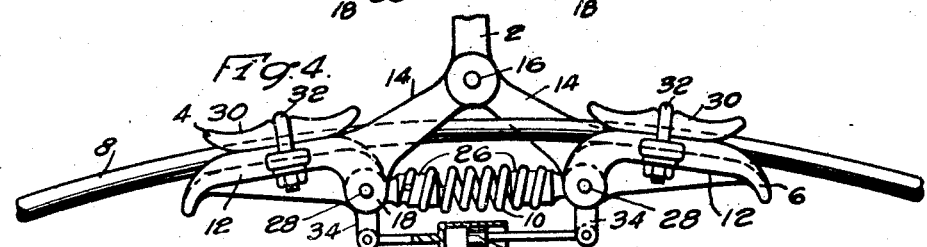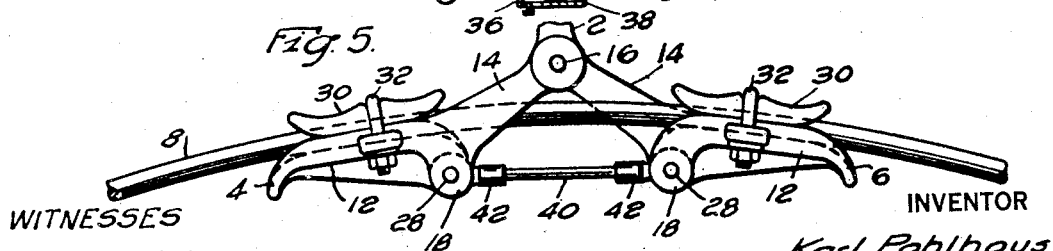

1,872,605

UNITED STATES PATENT OFFICE

KARL POHLHAUSEN, OF BERLIN-HALENSEE, GERMANY, ASSIGNOR TO WESTINGHOUSE ELECTRIC & MANUFACTURING COMPANY, A CORPORATION OF PENNSYLVANIA

TRANSMISSION LINE DEVICE

Application filed March 13, 1931, Serial No. 522,381, and in Germany April 8, 1930.

My invention relates to transmission-line devices, and particularly to means for supporting the cables thereof.

One object of my invention is to suppress vibrations in transmission-line cables.

Another object of my invention is to provide a vibration-reducing support or clamp that shall be simple and durable in construction, economical to manufacture and effective in its operation.

Another object of my invention is to so utilize a spring for damping transmission-line oscillations that it will not be required to support the weight of the line.

Another object of my invention is to provide a spring-controlled damping clamp that shall permit the removal and replacement of the spring while the clamp is in service.

A further object of my invention is to provide a clamp that shall be adapted to receive interchangeable parts for varying the operation thereof in accordance with different conditions.

In high-voltage transmission-line practice, it has heretofore been suggested to attach the line cables or conductors to suspension insulators by means of springs, in order to reduce oscillations and to thereby render the breaking of the cable, at its point of suspension, less likely to occur.

A serious objection to such devices is that the springs do not lend themselves to commercial manufacture in the degree of elasticity required.

An ordinary clamp causes fatigue of the cable, under line-oscillating conditions, and breakage of the cable similar to the manner in which a small copper wire may be broken by repeated bending at one spot.

In practicing my invention, I provide a device including a pair of clamps or cable-receiving elements that are disposed oppositely along the cable from a supporting element therefor; that are connected to the supporting element and are joined by a spring or other element to substantially reduce fatigue of the cable, to preclude the requirement for a spring capable of supporting the cable; to render the device adaptable to different operating conditions; to render certain parts readily replaceable and interchangeable and to provide a structure that is an improvement generally in this particular art.

Figure 1 of the accompanying drawing is a view, in side elevation, of a device embodying my invention, Fig. 2 is a diagram illustrating the operation of the invention in one of its aspects, Fig. 3 is a view, in side elevation, of a structure similar to that of Fig. 1, but possibly more desirable in commercial practice, and Figs. 4 and 5 are views, similar to a portion of Fig. 3, of modified forms of the invention.

Referring to Fig. 1, the device comprises a supporting or suspension element 2, members 4 and 6 for receiving a transmission-line cable 8 and a spring 10 connected between the members 4 and 6.

The element 2 may be a link for attachment to a suspension insulator, as shown in Fig. 3, or constitute a support of other suitable character.

The members 4 and 6 are adapted for the reception of the cable 8, each comprising a cable-receiving channel portion 12, a lever arm 14 for pivotal connection, as by a pin 16, to the element 2 and a portion 18 for securing the ends of the spring 8. The latter, as indicated in the subsequent figures, may be removably mounted, augmented by damping means or replaced by a rigid element or bar for operation under certain conditions.

The members 4 and 6 may be of sheet metal having the upper edges thereof crimped about the cable in clamping relation thereto or they may be of a usual malleable or drop-forged iron construction and clamped in other ways, as indicated in Fig. 3.

In operation, when the cable 8, at the left-hand side of the structure, as viewed in Fig. 1, oscillates or vibrates, the member 4 transfers the movement, through the spring 10, to the member 6. This movement sets up vibrations beyond the point of suspension, so that the energy of the vibration is divided or dissipated over an appreciable length of the cable. Overstressing and fatigue at localized portions of the cable are thereby avoided.

The action is illustrated diagrammatically in Fig. 2, in which the above-mentioned vibrations from the left-hand side of the device are passed through a pendulum 20, and vibrations from the right-hand side are passed through a pendulum 22, the vibrations being passed from one pendulum to the other through a spring 24 corresponding to the spring 10.

The distance "a", in Fig. 2, corresponds to the distance "a" in Fig. 1, which, if shortened or lengthened, would require a spring of different strength to correspondingly transfer and dampen vibration forces of like strength and amplitude. It is desirable that this distance be substantial in order to provide as much floating effect on the cable as is commercially feasible with the materials available.

In structures of the usual type, there is only one member, corresponding to one of the members 4 and 6, which is connected directly below the supporting element 2. With such structure, vertical components of the vibrations in the cable cause it to move vertically against the support, which is substantially rigid in the vertical direction, to cause fatigue and breakage in the cable.

By having the members 4 and 6 laterally displaced from the support 2, in opposite directions along the cable 8, the members 4 and 6 float more or less with the cable, so that the bending stresses at any local spot are materially reduced. The distance between the members 4 and 6 depends upon the diameter and rigidity of the cable and should be sufficient to permit substantial relative movement of the members 4 and 6, and to prevent undue localized bending of the cable.

Fig. 3 illustrates an adaptation of the device to usual practice by constituting the support 2 as a link depending from the bottom unit 25 of a flexible string of similar units that are connected in series relation. The members 4 and 6 may be duplicates if the arms 14 are disposed on opposite sides of the cable.

Blocks 26, having helical grooves therein for the reception of the ends of the spring 10 and end lugs for the reception of pins 28, provide a simple, convenient commercial structure whereby the spring may be removed and replaced while in service. Duplicate clamping shoes 30 may be employed with one or more U-bolts 32, or equivalent elements, to clamp the cable in the channels 12, as heretofore employed in practice.

In the modification of my invention shown in Fig. 4, extensions 34 on the blocks 26 support a cylinder 36 and a piston 38, respectively, constituting dash-pot means for further damping vibration forces and reducing the effect thereof on the cable.

In Fig. 5, a rigid rod 40 is provided with end portions 42, similar to the blocks 26, so that, under certain conditions, the spring may be dispensed with, if desired, and the rod substituted therefor. Springs, such as leaf springs, and damping elements and rods of other forms equivalent to the structures illustrated may be similarly employed.

While I have shown and described particular forms of my invention, changes may be effected therein without departing from the spirit and scope there, as set forth in the appended claims.

I claim as my invention:

1. A transmission-line device comprising a support, a plurality of relatively movable rigid members directly movably connected to the support above the line cable for association with the cable, and an elastic element below the cable for transmitting cable vibrations between said members.

2. In combination, in a transmission-line device, a suspension element, a pair of cable-receiving members having portions pivotally connected to the element above the cable for extension oppositely therefrom at opposite sides of the cable in the general direction of the line, and yieldable means connecting said members between positions thereon below the cable.

3. In combination, in a transmission-line device, a suspension element, a pair of cable-receiving members pivotally connected to the element and extending oppositely therefrom in the general direction of the line, and means displaced from the pivot positions thereof for receiving any one of a plurality of interchangeable elements for connection between said members.

4. In combination, in a transmission-line device, a suspension element, a pair of cable-receiving members pivotally connected to the element above the cable and having arms for extension oppositely therefrom in the general direction of the line at opposite sides of the cable, and means removably connecting said members between positions thereon below the cable.

5. In combination, a suspension insulator, a link movably depending therefrom, a pair of cable-clamps for disposition oppositely along the cable from the insulator, each having only one arm pivotally connected to said link above the cable, said arms being for disposition at opposite sides of the cable, and yieldable means connected between the clamps below the cable.

6. In combination, a suspension element, a pair of cable-clamps for disposition oppositely along the cable from said element, each having an arm pivotally connected thereto above the cable, and yieldable means connected between the clamps below the cable.

7. In combination, a suspension element, a pair of one-piece members each having pivotal connection thereto above the cable, and a cable-receiving portion, and means connected between said members below the cable.

8. In combination, a suspension element, a pair of one-piece members having a common pivotal connection thereto above the cable and each having a cable-receiving portion, and means connected between said members below the cable.

9. In combination, a suspension element, a pair of cable-receiving members for disposition oppositely along the cable from said element, each having an arm pivotally connected thereto above the cable, and yieldable means connected between the cable-receiving members below the cable.

10. In combination, a suspension element. a pair of cable-receiving members for disposition oppositely along the cable from said element, each having an arm pivotally connected thereto about the axis of the other above the cable, and yieldable means connected between the cable-receiving members below the cable.

In testimony whereof, I have hereunto subscribed my name this 9th day of December 1930.

KARL POHLHAUSEN.